(12) United States Patent
Tokumura

(10) Patent No.: US 9,826,190 B2
(45) Date of Patent: Nov. 21, 2017

(54) IMAGE PROCESSING DEVICE, DISPLAY DEVICE, AND DISPLAY METHOD FOR PREVENTING VISUAL RECOGNITION OF A BOUNDARY CAUSED BY FRC MODULATION

(71) Applicant: Seiko Epson Corporation, Tokyo (JP)

(72) Inventor: Toshiaki Tokumura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 47 days.

(21) Appl. No.: 14/832,369

(22) Filed: Aug. 21, 2015

(65) Prior Publication Data

US 2016/0057319 A1    Feb. 25, 2016

(30) Foreign Application Priority Data

Aug. 25, 2014  (JP) .................................. 2014-170176

(51) Int. Cl.
*H04N 5/21* (2006.01)
*H04N 5/74* (2006.01)
*G09G 3/36* (2006.01)
*G09G 3/20* (2006.01)

(52) U.S. Cl.
CPC ......... *H04N 5/7416* (2013.01); *G09G 3/2025* (2013.01); *G09G 3/2055* (2013.01); *G09G 3/2081* (2013.01); *G09G 3/36* (2013.01); *G09G 2320/0247* (2013.01); *G09G 2320/0266* (2013.01)

(58) Field of Classification Search
None
See application file for complete search history.

(56) References Cited

U.S. PATENT DOCUMENTS

| 5,596,349 A | 1/1997 | Kobayashi et al. |
| 5,784,040 A | 7/1998 | Kobayashi et al. |
| 2007/0109242 A1* | 5/2007 | Lee ..................... G09G 3/3611 345/89 |

FOREIGN PATENT DOCUMENTS

| JP | 06-118920 A | 4/1994 |
| JP | 2007-178509 A | 7/2007 |
| JP | 4807070 | 8/2011 |
| JP | 2013-222048 A | 10/2013 |

* cited by examiner

*Primary Examiner* — Edward Martello
(74) *Attorney, Agent, or Firm* — ALG Intellectual Property, LLC

(57) ABSTRACT

An image processing device includes a correction section adapted to perform a correction process of data of low (N−M) bits (N and M are integers fulfilling N>M) of a gray level value represented by input video data in a case in which the data of the low (N−M) bits coincides with a predetermined bit sequence, and a modulation section adapted to set data on which the correction process has been performed as target data with respect to the pixel having the data of the low (N−M) bits coinciding with the predetermined bit sequence, and perform a modulation process of modulating at least a part of data of high M bits of the target data using a bit sequence defined in accordance with the data of the low (N−M) bits in a plurality of unit periods.

10 Claims, 8 Drawing Sheets

|  | | EVEN ROW ||||||||
|  | | EVEN COLUMN |||| ODD COLUMN ||||
|  | | 1F | 2F | 3F | 4F | 1F | 2F | 3F | 4F |
| GRAY LEVEL VALUE | 00 | 0 | 0 | 0 | 0 | 0 | 0 | 0 | 0 |
| | 01 | 1 | 0 | 0 | 0 | 0 | 0 | 1 | 0 |
| | 10 | 1 | 0 | 1 | 0 | 0 | 1 | 0 | 1 |
| | 11 | 0 | 1 | 1 | 1 | 1 | 1 | 0 | 1 |

|  | | ODD ROW ||||||||
|  | | EVEN COLUMN |||| ODD COLUMN ||||
|  | | 1F | 2F | 3F | 4F | 1F | 2F | 3F | 4F |
| GRAY LEVEL VALUE | 00 | 0 | 0 | 0 | 0 | 0 | 0 | 0 | 0 |
| | 01 | 0 | 0 | 0 | 1 | 0 | 1 | 0 | 0 |
| | 10 | 0 | 1 | 0 | 1 | 1 | 0 | 1 | 0 |
| | 11 | 1 | 1 | 1 | 0 | 1 | 0 | 1 | 1 |

| 12 | 12 | 12.25 | 12.25 | 13 | 13 |
|---|---|---|---|---|---|
| 12 | 12 | 12.25 | 12.25 | 13 | 13 |
| 12 | 12 | 12.5 | 12.5 | 13 | 13 |
| 12 | 12 | 12.5 | 12.5 | 13 | 13 |

FIG. 9

| 12.5 | 12.5 | 12.25 | 12.25 | 13.5 | 13.5 |
|---|---|---|---|---|---|
| 12.5 | 12.5 | 12.25 | 12.25 | 13.5 | 13.5 |
| 12.5 | 12.5 | 12.5 | 12.5 | 13.5 | 13.5 |
| 12.5 | 12.5 | 12.5 | 12.5 | 13.5 | 13.5 |

FIG. 10

IMAGE PROCESSING DEVICE, DISPLAY DEVICE, AND DISPLAY METHOD FOR PREVENTING VISUAL RECOGNITION OF A BOUNDARY CAUSED BY FRC MODULATION

The entire disclosure of Japanese Patent Application No. 2014-170176, filed Aug. 25, 2014 is expressly incorporated by reference herein.

BACKGROUND

1. Technical Field

The present invention relates to a technology for expressing gradation using a so-called frame rate control (FRC) method in display devices.

2. Related Art

There has been known the FRC technology in order to make a light modulation element capable of expressing only a low number of gray levels display an image with a higher number of gray levels (e.g., JP-A-2007-178509 (Document 1) and JP-A-2013-222048 (Document 2)). The FRC is a technology of time-dividing an image to modulate the gray levels on the time axis to thereby increase the number of gray levels available for expression. For example, in the case of modulating an image using four frames in the light modulation element capable of 8-bit (256-gray level) expression, 10-bit (1024-gray level) expression is achievable.

In the technologies described in Document 1 or Document 2, the modulation fails to be applied to some pixels in which the lower bits of the input data correspond to a specific bit sequence (e.g., pixels with the low 2 bits of "00" in the example described above). In this case, there is a problem that if the pixel to which the modulation by the FRC is applied and the pixel to which the modulation by the FRC is not applied are adjacent to each other, the boundary is visually recognized in some cases.

SUMMARY

An advantage of some aspects of the invention is to provide a technology of suppressing the phenomenon that the boundary is visually recognized due to the modulation by the FRC in order to deal with the problem.

An aspect of the invention provides an image processing device adapted to make a light modulation element having a plurality of pixels each providing M-bit gradation expression display a plurality of images in chronological order, the image processing device including an input section adapted to receive input video data provided with N-bit (N and M are integers fulfilling N>M) gradation expression, a correction section adapted to perform a correction process of data of low (N–M) bits of a gray level value represented by the input video data in a case in which the data of the low (N–M) bits coincides with a predetermined bit sequence with respect to each of the pixels, a modulation section adapted to set data on which the correction process has been performed as target data with respect to the pixel having the data of the low (N–M) bits coinciding with the predetermined bit sequence, set the input video data as the target data with respect to the pixel having the data of the low (N–M) bits other than the predetermined bit sequence, and perform a modulation process of modulating at least a part of data of high M bits of the target data using a bit sequence defined in accordance with the data of the low (N–M) bits in a plurality of unit periods, and an output section adapted to output the data of the high M bits on which the modulation process has been performed by the modulation section.

According to the image processing device, the phenomenon that the boundary is visually recognized due to the modulation can be suppressed.

The predetermined bit sequence may be a bit sequence with which the data is the same between before and after the modulation process in the bit sequence defined and used in the modulation process.

According to the image processing device with this configuration, the phenomenon that the boundary between the region in which the data is different between before and after the modulation and the region in which the data is the same is visually recognized can be suppressed.

The modulation process may be a process of modulating at least a part of the data of the high M bits of the target data using the bit sequence defined in accordance with the data of the low (N–M) bits in the contiguous unit periods.

According to the image processing device with this configuration, the unit period to be modulated can temporally be dispersed.

The modulation process may be a process of adding the bit sequence defined in accordance with the data of the low (N–M) bits in the contiguous unit periods to at least a part of the data of the high M bits of the target data.

According to the image processing device with this configuration, the modulation can be performed with a simple calculation.

The bit sequence defined in accordance with the data of the low (N–M) bits may include a bit representing a positive/negative sign, and the modulation process may be a process of adding the bit sequence defined in accordance with the data of the low (N–M) bits in the contiguous unit periods to at least a part of the data of the high M bits of the target data including the positive/negative sign.

According to the image processing device with this configuration, a more variety of types of modulation can be performed.

The correction process may be a process of making a gray level value of the target pixel equal to a gray level value of a pixel adjacent to the target pixel.

According to the image processing device with this configuration, it is possible to prevent the magnitude relation of the gray level value with the adjacent pixel from being reversed between before and after the correction.

The correction process may be a process of adding an intermediate value of the (N–M) bits.

According to the image processing device with this configuration, the spatial distribution of the pixels to be modulated can be made more uniform.

The bit sequence defined in accordance with the data of the low (N–M) bits in the plurality of unit periods may be what has the bit values included in the bit sequence arranged in a permutation other than a permutation with which a frequency of changes of the bit value is the lowest of the permutations of the bit values.

According to the image processing device with this configuration, the temporal distribution of the unit periods in which a certain pixel is modulated can be made more uniform.

Another aspect of the invention provides a display device including a display section including a light modulation element having a plurality of pixels each providing M-bit gradation expression, an input section adapted to receive input video data provided with N-bit (N and M are integers fulfilling N>M) gradation expression for making the display section display a plurality of images in chronological order, a correction section adapted to perform a correction process of data of low (N−M) bits of a gray level value represented by the input video data in a case in which the data of the low (N−M) bits coincides with a predetermined bit sequence with respect to each of the pixels, a modulation section adapted to set data corrected by the correction section as target data with respect to the pixel having the data of the low (N−M) bits coinciding with the predetermined bit sequence, set the input video data as the target data with respect to the pixel having the data of the low (N−M) bits other than the predetermined bit sequence, and perform a modulation process of modulating at least a part of data of high M bits of the target data using a bit sequence defined in accordance with the data of the low (N−M) bits in a plurality of unit periods, and an output section adapted to output the data of the high M bits on which the modulation process has been performed by the modulation section.

According to the display device, the phenomenon that the boundary is visually recognized due to the modulation can be suppressed.

Still another aspect of the invention provides an image processing method in an image processing device adapted to make a light modulation element having a plurality of pixels each providing M-bit gradation expression display a plurality of images in chronological order, the image processing method including receiving input video data provided with N-bit (N and M are integers fulfilling N>M) gradation expression, performing a correction process of data of low (N−M) bits of a gray level value represented by the input video data in a case in which the data of the low (N−M) bits coincides with a predetermined bit sequence with respect to each of the pixels, setting data corrected in the performing of a correction process as target data with respect to the pixel having the data of the low (N−M) bits coinciding with the predetermined bit sequence, setting the input video data as the target data with respect to the pixel having the data of the low (N−M) bits other than the predetermined bit sequence, and performing a modulation process of modulating at least a part of data of high M bits of the target data using a bit sequence defined in accordance with the data of the low (N−M) bits in a plurality of unit periods, and outputting the data of the high M bits on which the modulation process has been performed.

According to the image processing method, the phenomenon that the boundary is visually recognized due to the modulation can be suppressed.

BRIEF DESCRIPTION OF THE DRAWINGS

The invention will be described with reference to the accompanying drawings, wherein like numbers reference like elements.

FIG. 9 is a diagram showing an example of input video data.

FIG. 10 is a diagram showing an example of video data corrected.

DESCRIPTION OF EXEMPLARY EMBODIMENTS

1. Outline

Figure 1A:
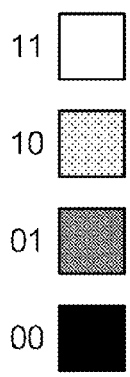
FIGS. 1A and 1B are diagrams showing a principle of the FRC.
Figure 1B:
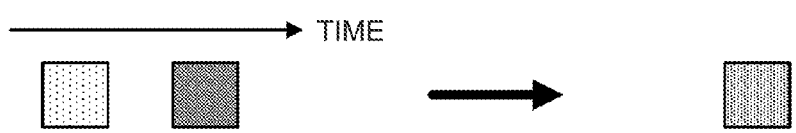

FIGS. 1A and 1B are diagrams showing a principle of the FRC. Here, there is considered a light modulation element capable of 2-bit (4-gray level) gradation expression, as an example. FIG. 1A is a diagram showing an example of the four gray levels which the light modulation element can display. When the gray level value is 00, 01, 10, or 11 in binary notation, the gray level of the pixel is black, dark gray, light gray, or white, respectively. In order to achieve the gradation expression exceeding the four gray levels with this light modulation element, an image is displayed in a time-division manner. For example, the period for displaying the image is divided into two parts. By changing the gray level displayed in one of the parts of the period thus divided, a gray level other than black, dark gray, light gray, and white can be expressed. For example, light gray is displayed in the anterior half of the period thus divided, and then dark gray is displayed in the posterior half thereof. If the period is shorter than the time resolution of an eye of the human, it appears to the eye of the human as if a gray level corresponding to a time average of the both gray levels, namely an intermediate gray level between light gray and dark gray, is displayed (FIG. 1B). Therefore, by time-dividing the period for displaying the image into $2^k$ parts, and modulating, namely changing, the gray level between the parts (hereinafter referred to as "frames") into which the period is time-divided, intermediate gray levels corresponding to k bits can artificially be displayed.

The fundamental principle of the FRC is as described above. When implementing the FRC, there is used a technology for making it difficult to visually recognize evidences of the FRC. Here, there is considered an example of making the light modulation element capable of 8-bit (256-gray level) gradation expression display an image with 10-bit (1024-gray level) gradation expression (i.e., an example in which the input video data is expressed with 10-bit gray levels). By dividing the period for displaying one image into four frames, and modulating the gray scale in these frames, intermediate gray scale levels corresponding to 2 bits can artificially be displayed. The intermediate gray levels corresponding to 2 bits are expressed as 00, 01, 10, and 11.

In order to display the intermediate gray level 01 (12.25 in decimal notation) between the gray level of 00001100 (12 in decimal notation) and the gray level of 00001101 (13 in decimal notation), it is sufficient to display the gray level of 00001101 in either one of the four frames, and the gray level of 00001100 in the rest three frames. It should be noted that at this moment, if it is arranged that the timing at which the gray level of 00001101 is displayed is spatially uniform, it appears that the screen flickers. For example, in the case of displaying the gray level of 12.25 in decimal notation in all of the pixels of the screen, if the gray level of 00001101 is displayed in all of the pixels in the same frame, it appears that the screen is flickering.

In order to prevent the timing at which the gray level is changed from becoming spatially uniform, the gray level is changed at the timing different between the pixels included in each of units each formed of a predetermined number of pixels adjacent to each other. In this control, look up tables (LUT) are used.

Figures 2, 3:
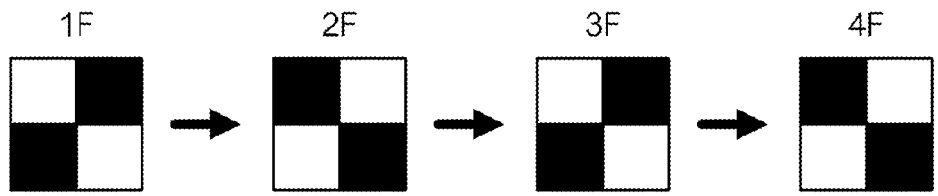
FIG. 2 is a diagram showing an example of the LUT used for the FRC.
FIG. 3 is a diagram showing an example of changes in the gray level due to the FRC.

FIG. 2 is a diagram showing an example of the LUT used for the FRC. In this example, using four pixels spatially adjacent to each other arranged in a 2×2 matrix as a unit, and using temporally contiguous four frames as a unit, modulation patterns for displaying the intermediate gray levels corresponding to 2 bits are defined. There are defined the modulation patterns different from each other in accordance with whether the target pixel is located in an even row or an odd row, and further, whether the target pixel is located in an even column or an odd column. It should be noted that the "modulation pattern" denotes temporal changes of the bit value used in the modulation process. Therefore, the LUT shown in FIG. 2 is an example of the defined bit sequence used in the modulation process. In this example, the modulation process is a process of adding the bit value shown in the modulation pattern to the eighth (highest) bit of the input video data.

For example, in order to display the intermediate gray level 01, it is sufficient to add 1 to the eighth bit of the input video data in either one of the contiguous four frames. According to the LUT shown in FIG. 2, the targets of the addition are the pixels located in even rows and even columns in the first frame (1F), the pixels located in odd rows and odd columns in the second frame (2F), the pixels located in the even rows and the odd columns in the third frame (3F), and the pixels located in the odd rows and the even columns in the fourth frame (4F).

FIG. 3 is a diagram showing an example of changes in the gray level due to the FRC. Here, for the sake of convenience of explanation, the four pixels arranged in a 2×2 matrix are shown alone. Further, the gray level of 00001100 and the gray level of 00001101 are expressed as white and black, respectively. In the input video data, these four pixels all have the intermediate gray level of 00001100.10 (12.5 in decimal notation) between the gray level of 00001100 (12 in decimal notation) and the gray level of 00001101 (13 in decimal notation). Here, using the gray level of the high 8 bits (00001100 in this example) of the input video data as a reference, an action of displaying the reference gray level (00001100 in this example) is expressed as "not modulated" or "a modulation is not applied," and an action of displaying the gray level (00001101 in this example) obtained by adding 1 to the least significant bit of the reference gray level is expressed as "modulated" or "a modulation is applied." Focusing attention on one pixel, two frames out of the four frames are modulated, and the rest two frames are not modulated. The modulation patterns are designed so as to minimize the chance for the frames thus modulated to be temporally contiguous. In other words, as the modulation patterns, there is adopted a permutation in which the frequency (repetition) of the change in bit value is as high as possible (the repetition is not the lowest) among the permutations of the bit values (0 or 1) included in the modulation pattern. The same applies to the spatial aspect, and focusing attention on one frame, two pixels out of the four pixels are modulated, and the rest two pixels are not modulated. The modulation patterns are designed so as to minimize the chance for the pixels thus modulated to be spatially contiguous.

Figures 4A, 4B:
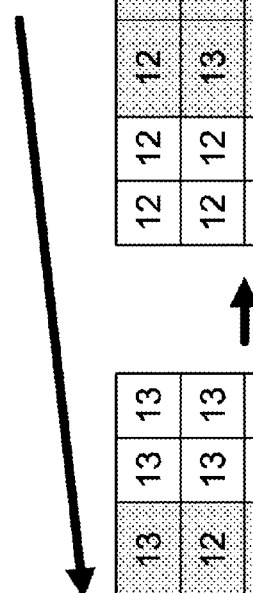
FIGS. 4A and 4B are diagrams showing a problem in the FRC.

FIGS. 4A and 4B are diagrams showing a problem in the FRC. FIG. 4A shows the input video data. Here, for the sake of convenience of explanation, the pixels arranged in a 4×6 matrix are shown alone. Further, the gray level values are expressed as decimal numbers. Specifically, in this example, the fractional portion corresponds to the low 2 bits of the input video data. If the LUT shown in FIG. 2 is used, the modulation is not applied to the pixels each having the gray level value expressed by an integer.

FIG. 4B is a diagram showing an example of transition of the gray level, which is displayed on the light modulation element based on the input video data shown in FIG. 4A, in the first through fourth frames. Although the modulation is applied to the central two columns in accordance with the LUT shown in FIG. 2, the modulation is not applied to the left two columns and the right two columns (in FIG. 4B, the pixels to which the modulation is applied are indicated by hatching). Here, if the region to which the modulation is applied and the region to which the modulation is not applied are adjacent to each other, the boundary between the regions is visually recognized in some cases. The boundary is recognized by the user as noise, and the user feels as if the image quality has deteriorated. The present embodiment copes with this problem.

2. Configuration

Figure 5:
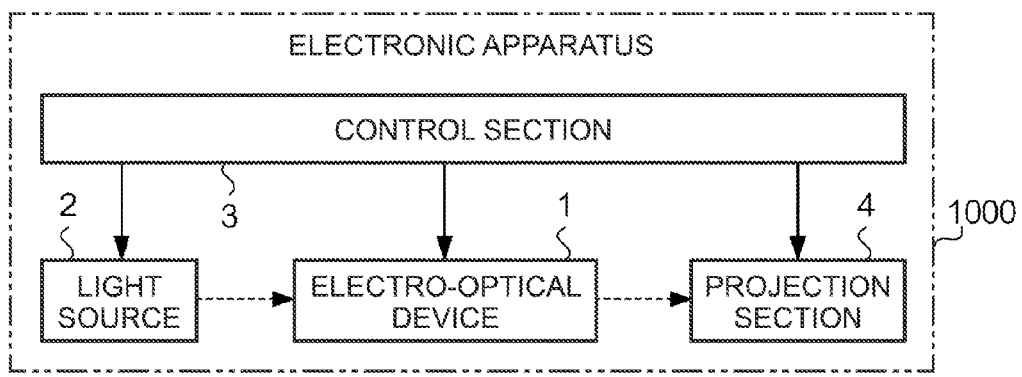
FIG. 5 is a diagram showing an example of a configuration of a display device 1000 according to an embodiment of the invention.

FIG. 5 is a diagram showing an example of a configuration of a display device 1000 according to an embodiment of the invention. In this example, the display device 1000 is a projector for projecting a picture corresponding to a video signal Vid-in input thereto on a screen. The display device 1000 includes an electro-optical device 1, a light source 2, a control section 3, and a projection section 4. In the display device 1000, the electro-optical device 1 modulates the light emitted from the light source 2, and then the projection section 4 projects the light thus modulated on the screen.

Figure 6:
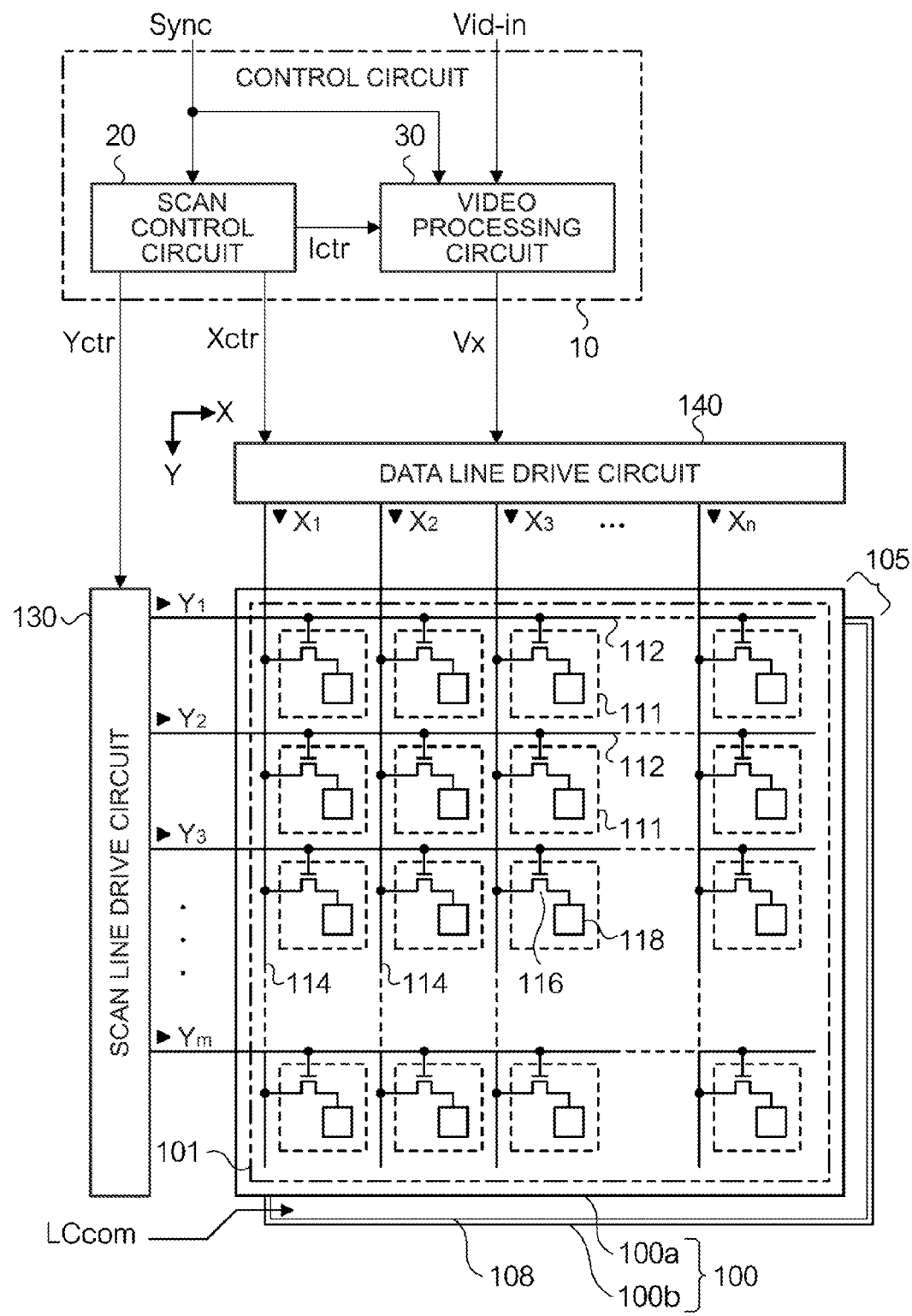
FIG. 6 is a diagram showing an example of a configuration of an electro-optical device 1.

FIG. 6 is a diagram showing a configuration of the electro-optical device 1. The electro-optical device 1 is a light modulator, and has three sets of circuits each including a liquid crystal panel 100, a scan line drive circuit 130, and a data line drive circuit 140, and a control circuit 10. The three sets of circuits respectively correspond to a color component R (red), a color component G (green), and a color component B (blue). Here, in order to avoid complication of the drawings, one set of liquid crystal panel 100 (an example of the light modulation element), the scan line drive circuit 130, and the data line drive circuit 140 are shown alone.

The control circuit 10 is provided with a scan control circuit 20 and a video processing circuit 30. The scan control circuit 20 generates various types of control signals such as a control signal Xctr, a control signal Yctr, and a control signal Ictr, to thereby control each of the sections in sync with the sync signal Sync. The video processing circuit 30 processes the digital video signal Vid-in to output the data signal Vx for each of the color components.

The liquid crystal panel 100 is a device for displaying an image in accordance with a signal supplied thereto. The liquid crystal panel 100 has the pixels 111 arranged in a m×n matrix. The pixels 111 each exhibit an optical state (e.g., the transmittance or the reflectance) corresponding to the signals supplied from the scan line drive circuit 130 and the data line drive circuit 140. The liquid crystal panel 100 controls the optical state of each of the plurality of pixels 111 to thereby display an image.

The liquid crystal panel 100 has a element substrate 100a, an opposed substrate 100b, and a liquid crystal 105. The element substrate 100a and the opposed substrate 100b are bonded to each other so as to keep a constant gap. The liquid crystal 105 is sandwiched in the gap.

The element substrate 100*a* has m scan lines 112 and n data lines 114 disposed on a surface opposed to the opposed substrate 100*b*. The scan lines 112 are disposed along an X (lateral) direction, and the data lines 114 are disposed along a Y (vertical) direction, and are isolated from each other. When distinguishing one scan line 112 from the rest of the scan lines 112, the scan lines 112 are referred to as first, second, third, . . . , $(m-1)^{th}$, and $m^{th}$ scan lines beginning at the top of the drawing. Similarly, when distinguishing one data line 114 from the rest of the data lines 114, the data lines 114 are referred to as first, second, third, . . . , $(n-1)^{th}$, and $n^{th}$ data lines beginning at the left of the drawing. The pixels 111 are disposed so as to correspond respectively to the intersections between the scan lines 112 and the data lines 114 when viewed from a viewpoint located perpendicular to the X axis and the Y axis.

It should be noted that although detailed explanation of the structure of the pixel 111 is omitted, a liquid crystal element, a switching element, and a retentive capacity are provided.

The scan line drive circuit 130 is a circuit for sequentially and exclusively selecting one scan line 112 from the m scan lines 112 (i.e., scanning the scan lines 112). Specifically, the scan line drive circuit 130 supplies the $i^{th}$ scan line 112 with a scan signal Yi in accordance with the control signal Yctr. In this example, the scan signal Yi is a signal set to a selecting voltage with respect to the scan signal 112 to be selected, and set to a non-selection voltage with respect to the scan line 112 not to be selected.

The data line drive circuit 140 is a circuit for outputting signals (hereinafter referred to as "data signals") each presenting a data voltage respectively to the n data lines 114. Specifically, the data line drive circuit 140 samples the data signal Vx supplied from the control circuit 10 in accordance with the control signal Xctr, and then outputs the result to the first through $n^{th}$ data lines as the data signals X1 through Xn, respectively.

The image displayed on the liquid crystal panel 100 is rewritten with a predetermined period. Hereinafter, the rewritten period (a unit period) corresponds to the frame. For example, in the case in which the image is rewritten at 60 Hz, one frame corresponds to about 16.7 ms. By the scan line drive circuit 130 scanning the m scan lines 112 once every frame, and the data line drive circuit 140 outputting the data signals, the image to be displayed on the liquid crystal panel 100 is rewritten.

Figure 7:
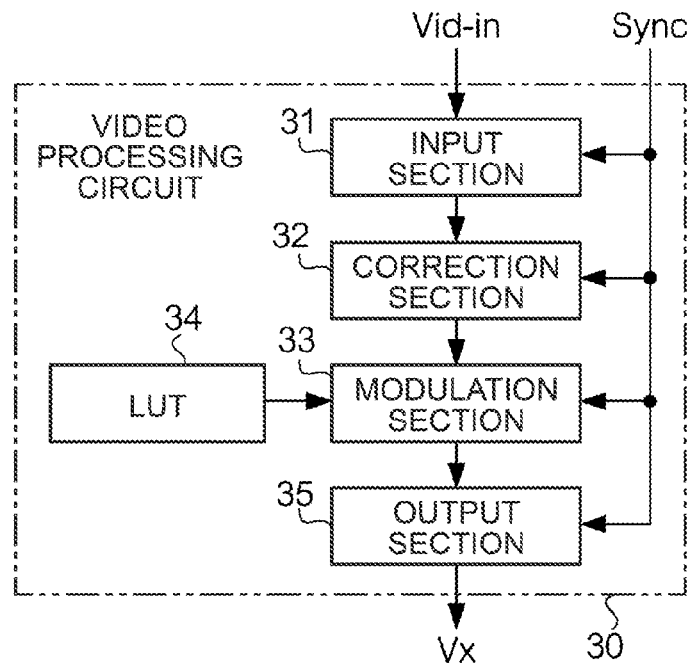
FIG. 7 is a diagram showing an example of a functional configuration of a control circuit 10.

FIG. 7 is a diagram showing an example of a functional configuration of the video processing circuit 30. The video processing circuit 30 outputs signals for controlling the scan line drive circuit 130 and the data line drive circuit 140 in accordance with the video signal Vid-in and the sync signal Sync supplied from a host device. The video processing circuit 30 is an example of the video processing device. The video signal Vid-in is a signal representing the input video data, and is a digital signal for designating the gray level values of the respective pixels in the liquid crystal panel 100. The video signal Vid-in is supplied in sync with the sync signal Sync. The sync signal includes a vertical scan signal, a horizontal scan signal, and a dot clock signal (all not shown). In this example, the frequency of the video signal Vid-in is 60 Hz. In other words, the image represented by the video signal Vid-in is rewritten every 16.67 millisecond.

It should be noted that in this example, since the FRC uses four frames as a unit, the liquid crystal panel 100 is driven at a frequency (240 Hz) four times as high as the frequency of the video signal Vid-in.

The video processing circuit 30 has an input section 31, a correction section 32, a modulation section 33, an LUT 34, and an output section 35.

The input section 31 receives the input video data. The input video data is data for making the liquid crystal panel 100 having the plurality of pixels 111 providing M-bit gradation expression display a plurality of images in chronological order. Further, the input video data is data provided with N-bit (here, N and M are integers fulfilling the relationship of N>M) gradation expression.

In the case in which among the plurality of pixels 111, the data of the low (N–M) bits of the gray level value represented by the input video data coincides with a predetermined bit sequence, the correction section 32 corrects the data of the low (N–M) bits. The details of the correction will be described later.

The modulation section 33 performs the modulation process on the data (hereinafter referred to as the "target data") of the processing target using the modulation patterns defined in the LUT 34. The target data is the data of the high M bits having been corrected in the case in which the correction by the correction section 32 has been performed, or the data of the high M bits of the input video data in the case in which the correction by the correction section 32 has not been performed. The modulation process is a process of adding the bit value shown in the modulation patterns to the $M^{th}$ bit (the least significant bit) of the target data.

The LUT 34 stores the modulation patterns. The LUT 34 outputs the bit values corresponding to the position of the processing target pixel and the current frame to the correction section 32 out of the modulation patterns having been defined in advance. It should be noted that the LUT 34 can be implemented as a hardware LUT, or can also be implement as a software LUT.

The output section 35 outputs the target data, on which the modulation process has been performed by the modulation section 33, to a circuit (the data line drive circuit 140 in this example) in the posterior stage.

3. Operation 3-1. Processing Flow

Figure 8:
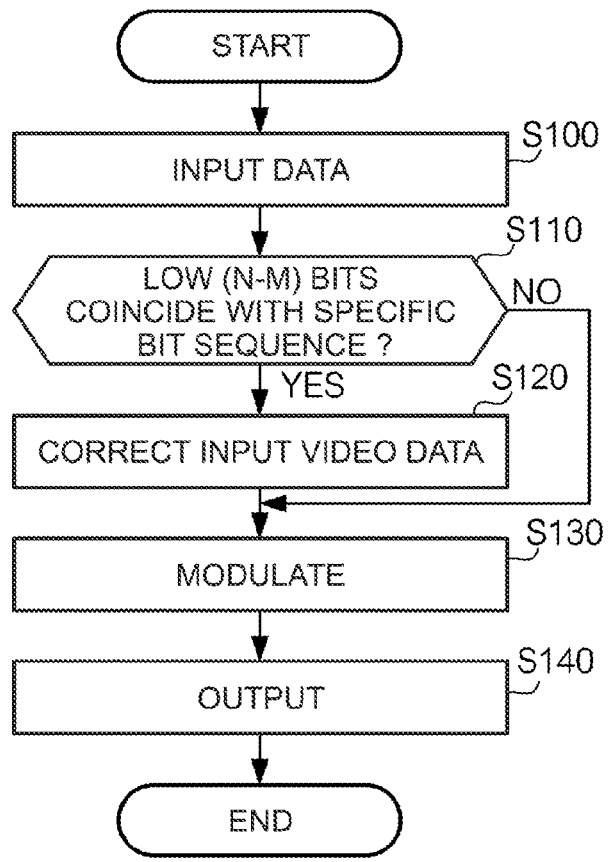
FIG. 8 is a flowchart showing an operation of the control circuit 10.

FIG. 8 is a flowchart showing an operation of the video processing circuit 30. The flow shown in FIG. 8 is triggered by, for example, the start-up of the display device 1000. Further, in this example, the resolution of the image represented by the input video data is equal to the resolution of the liquid crystal panel 100. It should be noted that in the case in which the resolution of the image represented by the input video data is different from the resolution of the liquid crystal panel 100, there is performed a resolution conversion for equalizing the resolution between the image represented by the input video data and the liquid crystal panel 100.

In the step S100, the input section 31 receives input of the input video data. In this example, the data of the plurality of pixels are arranged in a predetermined order in a chronological order in the video signal Vid-in. Therefore, the data of the plurality of pixels are sequentially input to the input section 31 pixel by pixel. The order of the data in the video signal Vid-in is, for example, an order having the pixel located at the upper left apex of the image as a starting point, proceeding sequentially rightward pixel by pixel, and proceeding to the pixel located at the left end in the lower row following the pixel located at the right end. The input section 31 outputs the input video data to the correction section 32 pixel by pixel. Hereinafter, the pixel to be the processing target in each of the elements is referred to as a "processing target pixel."

In the step S110, the correction section 32 determines whether or not the data of the low (N−M) bits out of the data of the processing target pixel represented by the input video data coincides with the specific bit sequence. For example, in the case in which N=10 and M=8 are true, the video processing circuit 30 determines whether or not the data of the low 2 bits coincides with the specific bit sequence. The "specific bit sequence" mentioned here is the bit sequence to which the modulation by the modulation section 33 is not applied, namely the bit sequence with which the data is the same between before and after the modulation process. In the example of the LUT shown in FIG. 2, "00" corresponds to the "specific bit sequence." In the case in which it is determined that the data of the low (N−M) bits coincides with the specific bit sequence (YES in the step S110), the correction section 32 makes the transition of the process to the step S120. In the case in which it is determined that the data of the low (N−M) bits does not coincide with the specific bit sequence (NO in the step S110), the correction section 32 makes the transition of the process to the step S130.

In the step S120, the correction section 32 performs the correction on the data of the processing target pixel. This correction is a correction for changing the data, to which the modulation is not originally applied, to the data to which the modulation is applied. Specifically, this correction is a correction for changing the data of the low (N−M) bits from the "specific bit sequence" to a bit sequence other than the "specific bit sequence." The correction section 32 outputs the corrected data to the modulation section 33. It should be noted that although any bit sequence can be adopted as the bit sequence obtained by the correction providing the modulation can be applied to the bit sequence, the following correction, for example, is performed.

(1) Correction of Minimizing Difference from Original Data

From the viewpoint that the smaller the difference from the original data is, namely the smaller the difference from the input video data is, the better the state of the original data is maintained, the smaller the difference from the original data, the more preferable. Therefore, from this viewpoint, the correction of adding "1" to the least significant bit of the data of the processing target pixel is preferable. In this correction, referring to the example of the LUT shown in FIG. 2, the data of the low 2 bits is changed from "00" to "01." Referring to the case of decimal numbers, for example, the gray level value "12" is corrected to "12.25," and the gray level value "13" is corrected to "13.25."

(2) Correction of Adopting Intermediate Value Between Before and after Modulation From the viewpoint of the uniformity of the spatial distribution of the pixels, to which the modulation is applied, in a certain frame, it is preferable for the gray level value of the corrected data to be an intermediate value between the gray level value of the data to which the modulation is not applied and the gray level value of the data to which the modulation is applied in the case of performing the modulation process. In this correction, referring to the example of the LUT shown in FIG. 2, the data of the low 2 bits is changed from "00" to "10." In other words, this process is a process of changing the data to the intermediate value ("10" as the intermediate value of "01," "10," "11") of the permutations obtained by excluding the "specific bit sequence" ("00" in the example shown in FIG. 2) from the permutations of the low 2 bits. For example, in the case in which the gray level value of the data to which the modulation is not applied is "12" in decimal notation, and the gray level value of the data to which the modulation is applied is "13" in decimal notation, the value is corrected to "12.5" in decimal notation.

(3) Correction of Adopting the Same Gray Level as Adjacent Pixel

It is not preferable that the magnitude relation of the gray level value between the data on which the correction has been performed and the data of the adjacent pixel is reversed compared to the magnitude relation of the gray level value between the original data and the data of the adjacent pixel. For example, in the case in which the gray level value of the first pixel is "12" in decimal notation, and the gray level value of the second pixel adjacent to the first pixel is "12.25" in decimal notation, if the gray level value of the first pixel is corrected to "12.5," the magnitude relation of the gray level value is reversed from the case of the original data. Specifically, the relation of (gray level value of the first pixel)<(gray level value of the second pixel) in the case of the original data is reversed to the relation of (gray level value of the first pixel)>(gray level value of the second pixel) in the case of the corrected data. In order to avoid such circumstances, it is also possible to perform the correction under the condition that the magnitude relation with the adjacent pixel is not reversed even after the correction is performed. For example, while performing the correction of adopting the intermediate value between before and after the modulation as a general rule, in the case in which the magnitude relation of the gray level value with the adjacent pixel is reversed if the correction is performed, it is possible to limit the correction within the range in which the magnitude relation of the gray level value is not reversed. For example, in the case in which the gray level value of the first pixel is "12" in decimal notation, and the gray level value of the second pixel adjacent to the first pixel is "12.5" in decimal notation, it is possible to correct the gray level value of the first pixel to "12.5," and in the case in which the gray level value of the second pixel is "12.25," it is possible to correct the gray level value of the first pixel to "12.25."

It should be noted that the "adjacent pixel" means a pixel adjacent to the processing target pixel in either of upward, downward, rightward, and leftward directions. Alternatively, it is also possible to set only the pixel adjacent in a specific direction (e.g., the rightward direction) as the target of the limitation of preventing the magnitude relation of the gray level value from changing.

In the step S130, the modulation section 33 performs the modulation process. In the modulation process, the LUT 34 is used. When the modulation section 33 outputs the data of the low (N−M) bits of the processing target pixel, the coordinate of the processing target pixel, and the information of the frame number of the current frame to the LUT 34, the LUT 34 outputs the corresponding bit value to the modulation section 33 among the modulation patterns. The modulation section 33 adds the bit value, which has been output from the LUT 34, to the $M^{th}$ bit of the data of the processing target pixel.

In the step S140, the output section 35 outputs the data (data of the high M bits) thus modulated. The process of the steps S110 through S140 is sequentially performed on each of the pixels.

3-2. Operation Example

Hereinafter, an operation example will be explained using specific data.

FIG. 9 is a diagram showing an example of the input video data. It should be noted that the data is the same as the input video data shown in FIG. 3A as an example. In this example, the data the gray level value of which is an integer is determined in the step S110 as the data the low 2 bits of which has the "specific bit sequence." Therefore, the data in the left two columns and the data in the right two columns are the target of the correction.

FIG. 10 is a diagram showing an example of the video data corrected. In this example, the correction of adding "0.5" to the gray level value of the input video data is performed.

Figure 11:
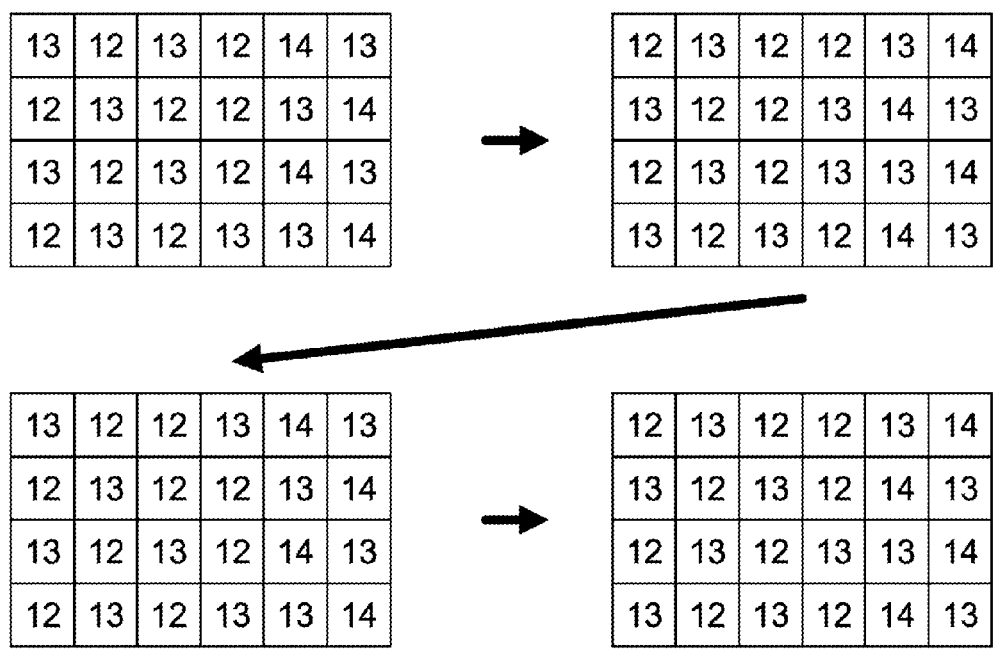
FIG. 11 is a diagram showing an example of video data modulated.

FIG. 11 is a diagram showing an example of the video data modulated. In the modulation, there is used the LUT shown in FIG. 2. According to this example, the modulation is applied to the pixels, to which the modulation is not applied in the related art technology, and the possibility that the boundary between the region to which the modulation is applied and the region to which the modulation is not applied is visually recognized is reduced.

4. Modified Examples

The invention is not limited to the embodiment described above, but can be put into practice with a variety of modifications. Hereinafter, some modified examples will be explained. It is also possible to use two or more of the modified examples described below in combination.

The modulation process in the modulation section 33 is not limited to the process explained as the embodiment. It is also possible to adopt a configuration of performing the modulation using a process other than addition, namely subtraction or multiplication. Further, the modulation pattern is also not limited to those shown in FIG. 2 as an example. For example, it is also possible that the modulation pattern includes positive and negative signs in addition to the bit value (e.g., +1, −1), and in the modulation process, the addition is performed including the signs. Further, although in the example shown in FIG. 2, the gray level value is switched frame by frame using the four frames as a unit, it is also possible that, for example, the gray level value is switched every two frames using eight frames as a unit. Further, the spatial unit in the modulation process is not limited to the four pixels arranged in a 2×2 matrix.

The hardware configuration of the display device 1000 is not limited to what is explained as the embodiment. Providing the FRC is used in the hardware configuration, it is possible for the display device 1000 to be provided with any hardware configuration.

The light modulation element used in the display device 1000 is not limited to the liquid crystal panel. It is also possible to adopt a device using the light modulation element such as a digital mirror device (DMD) other than the liquid crystal.

The display device 1000 is not limited to a projector. The display device 1000 can also be a direct-view display.

What is claimed is:

1. An image processing device adapted to make a light modulation element having a plurality of pixels each providing M-bit gradation expression display a plurality of images in chronological order, the image processing device comprising:
an input section adapted to receive input video data provided with N-bit (N and M are integers fulfilling N>M) gradation expression;
a correction section adapted to perform a correction process of data of low (N−M) bits of a gray level value represented by the input video data in a case in which the data of the low (N−M) bits of the data coincide with a predetermined bit sequence with respect to each of the pixels;
a modulation section adapted to set data on which the correction process has been performed as target data with respect to the pixel having the data of the low (N−M) bits coinciding with the predetermined bit sequence, set the input video data as the target data with respect to the pixel having the data of the low (N−M) bits other than the predetermined bit sequence, and perform a modulation process of modulating at least a part of data of high M bits of the target data using a bit sequence defined in accordance with the data of the low (N−M) bits in a plurality of unit periods; and
an output section adapted to output the data of the high M bits on which the modulation process has been performed by the modulation section,
wherein the correction process is performed for input video data corresponding to pixels having low (N−M) bits coinciding with the predetermined bit sequence to change the low (N−M) bits of the pixels having low (N−M) bits coinciding with the predetermined bit sequence to coincide with a bit sequence other than the predetermined bit sequence, and the correction process is not performed for input video data corresponding to pixels having low (N−M) bits coinciding with the bit sequence other than the predetermined bit sequence such that the low (N−M) bits of pixels having low (N−M) bits coinciding with the bit sequence other than the predetermined bit sequence have a same bit sequence both before and after the correction process.

2. The image processing device according to claim 1, wherein
the predetermined bit sequence is a bit sequence with which the data is the same between before and after the modulation process in the bit sequence defined and used in the modulation process.

3. The image processing device according to claim 1, wherein
the modulation process is a process of modulating at least a part of the data of the high M bits of the target data using the bit sequence defined in accordance with the data of the low (N−M) bits in the contiguous unit periods.

4. The image processing device according to claim 1, wherein
the modulation process is a process of adding the bit sequence defined in accordance with the data of the low (N−M) bits in the contiguous unit periods to at least a part of the data of the high M bits of the target data.

5. The image processing device according to claim 4, wherein
the bit sequence defined in accordance with the data of the low (N−M) bits includes a bit representing a positive/negative sign, and
the modulation process is a process of adding the bit sequence defined in accordance with the data of the low (N−M) bits in the contiguous unit periods to at least a part of the data of the high M bits of the target data including the positive/negative sign.

6. The image processing device according to claim 1, wherein
the correction process is a process of making a gray level value of the target pixel equal to a gray level value of a pixel adjacent to the target pixel.

7. The image processing device according to claim 1, wherein
the correction process is a process of adding an intermediate value of the (N−M) bits.

8. The image processing device according to claim 1, wherein
the bit sequence defined in accordance with the data of the low (N−M) bits in the plurality of unit periods is what has the bit values included in the bit sequence arranged in a permutation other than a permutation with which a frequency of changes of the bit value is the lowest of the permutations of the bit values.

9. A display device comprising:
a display section including a light modulation element having a plurality of pixels each providing M-bit gradation expression;
an input section adapted to receive input video data provided with N-bit (N and M are integers fulfilling N>M) gradation expression for making the display section display a plurality of images in chronological order;
a correction section adapted to perform a correction process of data of low (N−M) bits of a gray level value represented by the input video data in a case in which the low (N−M) bits of the data coincide with a predetermined bit sequence with respect to each of the pixels;
a modulation section adapted to set data corrected by the correction section as target data with respect to the pixel having the data of the low (N−M) bits coinciding with the predetermined bit sequence, set the input video data as the target data with respect to the pixel having the data of the low (N−M) bits other than the predetermined bit sequence, and perform a modulation process of modulating at least a part of data of high M bits of the target data using a bit sequence defined in accordance with the data of the low (N−M) bits in a plurality of unit periods; and
an output section adapted to output the data of the high M bits on which the modulation process has been performed by the modulation section,
wherein the correction process is performed for input video data corresponding to pixels having low (N−M) bits coinciding with the predetermined bit sequence to change the low (N−M) bits of the pixels having low (N−M) bits coinciding with the predetermined bit sequence to coincide with a bit sequence other than the predetermined bit sequence, and the correction process is not performed for input video data corresponding to pixels having low (N−M) bits coinciding with the bit sequence other than the predetermined bit sequence such that the low (N−M) bits of pixels having low (N−M) bits coinciding with the bit sequence other than the predetermined bit sequence have a same bit sequence both before and after the correction process.

10. An image processing method in an image processing device adapted to make a light modulation element having a plurality of pixels each providing M-bit gradation expression display a plurality of images in chronological order, the image processing method comprising:
receiving input video data provided with N-bit (N and M are integers fulfilling N>M) gradation expression;
performing a correction process of data of low (N−M) bits of a gray level value represented by the input video data in a case in which the low (N−M) bits of the data coincide with a predetermined bit sequence with respect to each of the pixels;
setting data corrected in the performing of a correction process as target data with respect to the pixel having the data of the low (N−M) bits coinciding with the predetermined bit sequence, setting the input video data as the target data with respect to the pixel having the data of the low (N−M) bits other than the predetermined bit sequence, and performing a modulation process of modulating at least a part of data of high M bits of the target data using a bit sequence defined in accordance with the data of the low (N−M) bits in a plurality of unit periods; and
outputting the data of the high M bits on which the modulation process has been performed,
wherein the correction process is performed for input video data corresponding to pixels having low (N−M) bits coinciding with the predetermined bit sequence to change the low (N−M) bits of the pixels having low (N−M) bits coinciding with the predetermined bit sequence to coincide with a bit sequence other than the predetermined bit sequence, and the correction process is not performed for input video data corresponding to pixels having low (N−M) bits coinciding with the bit sequence other than the predetermined bit sequence such that the low (N−M) bits of pixels having low (N−M) bits coinciding with the bit sequence other than the predetermined bit sequence have a same bit sequence both before and after the correction process.

* * * * *